March 2, 1943.  N. A. NELSON  2,312,576
FISHING REEL
Filed May 18, 1940
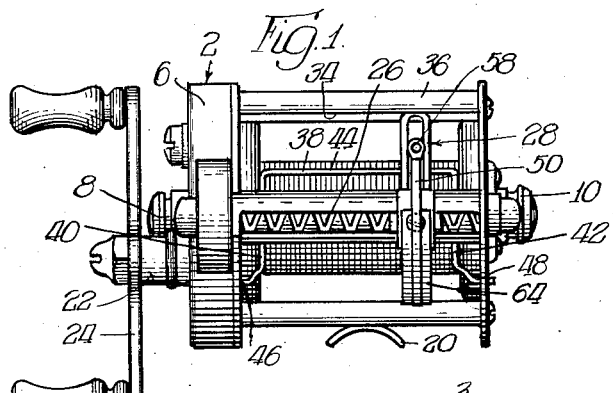
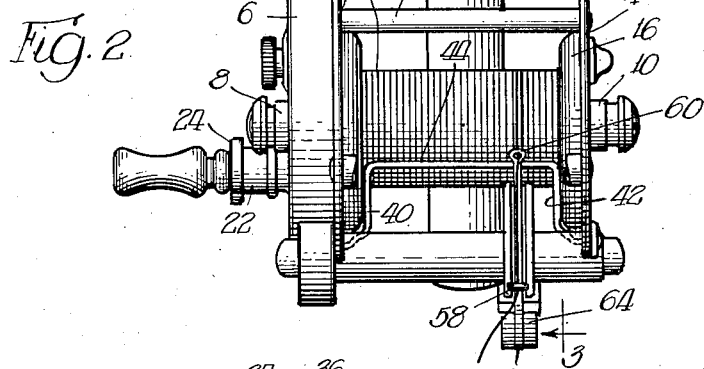
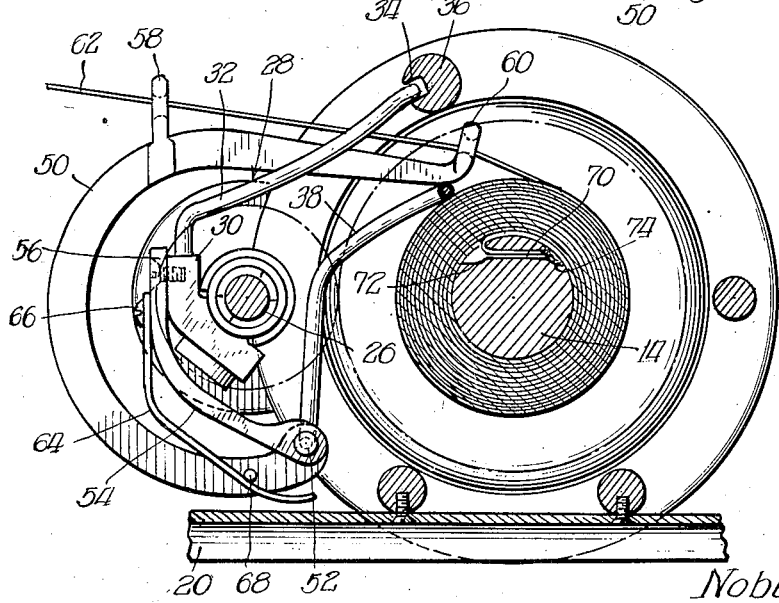
INVENTOR.
Noble A. Nelson,
BY Wilkinson Huxley, Byron & Knight
attys.

Patented Mar. 2, 1943

2,312,576

UNITED STATES PATENT OFFICE 2,312,576

FISHING REEL

Noble A. Nelson, Chicago, Ill.

Application May 18, 1940, Serial No. 335,885

12 Claims. (Cl. 242—84.4)

The present invention relates to improvements in fishing reels.

Among the objects of the present invention is to provide novel structure in a fishing reel to make possible smooth level winding of line upon the spool thereof and to assure proper paying out of the said line from the said spool during a casting operation irrespective of the condition of said line.

Still another object of the present invention is to provide novel structure constituted in part by a line follower and in part by a line guide finger which cooperate to facilitate casting by causing the line to be payed out directly from the reel to the guide finger during a casting performance, the said guide finger being so disposed and arranged in respect of the line wound upon the reel as to facilitate uniform and level winding of the line upon the spool when the same is retrieved.

Still another desideratum within the scope of the invention is to provide novel structure in a fishing reel which embraces a line follower engagingly resting upon the line wound upon the reel in such a position as to assure proper paying out of the line during a casting operation.

Still another object of the present invention is to provide a novel structure embodying the line follower as above related, together with a guide finger movable transversely of the reel in accordance with the movement of the spool and having sliding cooperation with the said line follower whereby the line is uniformly wound upon the spool and efficiently and effectively payed out during a casting operation without backlash and irrespective of the condition of the said line.

More particularly, the present invention embraces within its scope novel structure embodying the line follower and guide finger above set forth, which are pivoted on coincidental pivotal axes whereby said line follower and guide finger are maintained in substantially the same relative position to one another and the line upon the spool irrespective of the amount thereof upon said spool, thereby facilitating paying out of said line during a casting operation irrespective of the condition of said line and without backlash, as well as to provide for smooth level winding of the line upon the spool in a retrieving operation.

The invention embodies structure in the form of a guide finger having a suitable base and associated spring means adapted to cooperate with the said guide finger to maintain its operative position with respect of the line follower irrespective of the quantity of line wound upon the spool at any one time. The invention, in one of its aspects, contemplates structure in the form of an attachment constituted by the line follower and the guide finger which may be connected to reels of conventional design, the said guide finger being operatively connected to the level winding mechanism on such reels and operated thereby, all in accordance with the present invention.

Other objects, features, capabilities and advantages are comprehended by the invention, as will later appear and as are inherently possessed thereby.

Referring to the drawing:

Figure 1 is a view in front elevation of a fishing reel embodying structure in accordance with the present invention;

Figure 2 is a top plan view of the fishing reel as shown in Figure 1 of the drawing, with parts broken away to disclose the subject matter of the present invention more in detail; and Figure 3 is a fragmentary view in cross section taken in the plane represented by line 3—3 of Figure 2 of the drawing.

Referring now more in detail to the drawing, an embodiment selected to illustrate the present invention is disclosed as a multi-part attachment applied to a reel 2 of conventional design, although it is to be understood that the said attachment may be embodied in a reel structure wherein certain of the parts thereof may be omitted, as will be hereinafter more fully disclosed.

The reel 2, as shown in the drawing, is constituted by a frame structure formed in part by the plate 4 and in part by the gear housing 6 which provide journal bearings, generally represented as 8 and 10, for a spool 12 disposed therebetween, which spool is formed with the arbor 14 and side cheeks or plates, such as 16, in operative association with the plate 4 and the inner plate forming the housing 6. The said frame is further constituted by the ties or cross rods, such as 18, interconnecting the plate 4 and housing 6 to properly position the spool 12, certain of these ties or cross rods forming a support for the mounting plate 20 whereby the reel can be secured to a fishing pole. Disposed within the housing 6 are the conventional gears found in a reel of this kind which are operated by the shaft 22 to which is connected handle 24 whereby the spool is rotated in the journal bearings 8 and 10 for retrieving the line connected thereto, these gears also operating during a casting operation, at which time the spool is rotated in the journal bearings as the line is payed out for said casting operation.

The reel as above described further embodies in its structure the double threaded shaft 26 of conventional design, suitably mounted in the frame structure of the reel and operated by means of suitable gearing within the housing 6, the said shaft forming a support for level winding mechanism generally referred to as 28, and supplied with the said reel, said mechanism being constituted by the support 30 having means cooperating with the threads of shaft 26 whereby the same is moved reciprocally axially of the spool 12. This support 30 is provided with the line guide 32 having one end thereof mounted in the support 30 and its other end operable within the groove 34 of the transverse cross tie 36 whereby the same is properly guided during the movement of the support 30 axially with respect of shaft 26.

The above described mechanism is conventional and has been referred to only for the purpose of laying a proper foundation on which to describe the operation of the structure forming the subject matter of the present invention. It has been found that although the level winding mechanism 28, above described, has assisted to a certain extent in facilitating a casting operation for the reason that the said line is more uniformly distributed upon the spool than could be effected by a caster himself, nevertheless such structure is not disposed or constructed in such a manner, nor arranged in respect of the line upon the spool, as to prevent backlash or assure the proper paying out of the line during a casting operation. These inadequacies have been fully overcome by the incorporation of the structure according to the present invention in these reel mechanisms.

The said subject matter of the present invention is constituted by an attachment formed in part by a line follower 38 of substantially U-shaped construction having the legs 40 and 42, and the transverse part 44 disposed therebetween, which line follower is adapted to be pivoted as at 46 and 48 in the frame structure of the reel and in such a position that the transverse part 44 engagingly rests upon the line wound upon the spool 12. This line follower accordingly has its pivot points disposed below the shaft 26 so as to position its transversely disposed part 44 immediately adjacent the point where line is being payed out from the spool 12 for a purpose to be hereinafter more fully disclosed.

The said attachment is further constituted by guide finger 50 of hook-shaped construction, one end thereof being pivoted as at 52 to a support or arm 54 depending from and connected as by means of a screw 56 or the like, to the support 30 of the level winding mechanism 28. The said hook-shaped guide finger is provided with the spaced line guides 58 and 60 to receive the line 62 which extends from the spool 12 therethrough and thence through similar guides provided on the pole to which the reel is attached. The said hook-shaped guide finger has its end adjacent guide 60 in slidable engagement with the transverse part 44 of the line follower whereby the said transverse part 44 of the line follower provides a support for movement of the inner end of the guide finger 50 as the same moves reciprocally axially of the spool 12 during a paying out or retrieving of the line connected to the spool.

In order to maintain this operative association between the transverse part 44 and the inner end of the hook-shaped guide finger 50, the pivot point 52 for said hook-shaped guide finger 50 substantially coincides with the pivotal axis for the line follower 38 so that, irrespective of the amount of line wound upon the reel 12, the said inner end of the hook-shaped guide finger is maintained in the same relation to the transverse part 44 to position guide 60 in close association with the line being payed out from or retrieved onto the spool. The positioning of the guide finger 50 and line follower 38 with respect of the line wound upon the spool 12 is effected through the medium of a bifurcated leaf spring 64 attached to the arm 54 as at 66 and straddling the guide finger 50 to engage the pin 68 extending laterally on both sides thereof. This spring 64 may be suitably adjusted by manipulation thereof to exert the desired amount of pressure on the guide finger 50 whereby the inner end thereof follows the movement of transversely disposed part 44 of the line follower during all operations of the reel.

As above stated, the level winding line guide 32, although disclosed in the drawing, is not considered essential to the operation of the present device inasmuch as line guides 58 and 60 disposed in a plane perpendicular to the axis of the spool 12 constitute proper guiding of the line being payed out and retrieved. Furthermore, although the present invention contemplates providing the present structure as an attachment for existing reels having level winding mechanism, nevertheless the invention is not confined thereto and embodies within its scope the idea of providing suitable mounting mechanism for the hook-shaped guide finger which will cooperate with the transversely disposed shaft, such as 26, for transverse movement of said guide finger in its cooperative relation with the line follower, all in accordance with the present disclosure.

To assure level winding of the line upon the spool, the arbor 14 is provided with a transverse opening 70 of small diameter positioned at one end of the arbor 14 and adapted to receive the one end of the line being wound upon the spool. This opening is countersunk as at 72 and 74 to receive the knotted end of the said line extending through the said opening for securing the same to the arbor 14 without having any part of the end of the line extending above the surface of the spool shaft or arbor which would otherwise prevent level winding of the line upon the spool.

In connection with the above described structure, it will be noted that the guide finger and line follower maintain their proper associated relation with one another irrespective of the amount of line disposed upon the reel. Furthermore, it is also to be noted that the transversely disposed part 44 of the line follower is in a position to prevent a sticky line from riding on around the spool, which does happen in present-day reel constructions, leading to backlash and entanglement of the line on the spool, which prevents the completion of what would otherwise be a good cast. It will also be noted that the line guide 60 is disposed at all times immediately adjacent the point at which the line is being wound or unwound from the spool, which prevents the line from waving or crossing over or under, thus greatly facilitating casting and retrieving thereof and enabling more line to be applied to the spool.

The spring tension applied to the guide finger 50 is also sufficient to maintain the transversely disposed part 44 of the line follower in proper operative association with the line wound upon the spool and exerts a slight amount of pressure on said spool to prevent overrun thereof substantially at the end of a cast, which might otherwise cause entanglement of the line on the spool at the completion of the cast.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. In a fishing reel, the combination of a frame, a spool rotatably mounted in said frame, a support movably mounted for axial movement with respect to said spool, means operable in accordance with the movement of said spool for moving said support, a line follower mounted on said frame and engagingly resting upon the line wound upon said spool, and a guide finger engaging said line follower, said guide finger being mounted on said support for movement toward and away from said line follower.

2. In a fishing reel, the combination of a frame, a spool rotatably mounted in said frame, a support movably mounted for axial movement with respect to said spool, means operable in accordance with the movement of said spool for moving said support, a line follower mounted on said frame and engagingly resting upon the line wound upon said spool, a guide finger engaging said line follower, said guide finger being mounted on said support for movement toward and away from said line follower, and spring means for maintaining the engaging relation of said guide finger with said line follower.

3. In a fishing reel, the combination of a frame, a spool rotatably mounted in said frame, a support movably mounted for axial movement with respect to said spool, means operable in accordance with the movement of said spool for moving said support, a line follower mounted on said frame and engagingly resting upon the line wound upon said spool, a guide finger engaging said line follower, said guide finger being mounted on said support for movement toward and away from said line follower, said guide finger having spaced line guides, and spring means for maintaining the engaging relation of said guide finger with said line follower.

4. In a fishing reel, the combination of a frame, a spool rotatably mounted in said frame, a support movably mounted for axial movement with respect to said spool, means operable in accordance with the movement of said spool for moving said support, a line follower swingably mounted upon said frame and engagingly resting upon the line wound upon said spool, and a guide finger engaging said line follower, said guide finger being mounted on said support for movement toward and away from said line follower.

5. In a fishing reel, the combination of a frame, a spool rotatably mounted in said frame, a support movably mounted for axial movement with respect to said spool, means operable in accordance with the movement of said spool for moving said support, a swingably mounted line follower engagingly resting upon the line wound upon said spool, a guide finger movably mounted upon said support and engaging said line follower, and spring means for maintaining the engaging relation of said guide finger with said line follower.

6. In a fishing reel, the combination of a frame, a spool rotatably mounted in said frame, a support movably mounted for axial movement with respect to said spool, means operable in accordance with the movement of said spool for moving said support, a line follower swingably mounted upon said frame and engagingly resting upon the line wound upon said spool, a guide finger engaging said line follower, said guide finger being mounted on said support for movement toward and away from said line follower, said guide finger having spaced line guides, and spring means for maintaining the engaging relation of said guide finger with said line follower.

7. In a fishing reel, the combination of a frame, a spool rotatably mounted in said frame, a support movably mounted for axial movement with respect to said spool, means operable in accordance with the movement of said spool for moving said support, a line follower pivoted to said frame and having an axially disposed part engagingly resting upon the line wound upon said spool, and a pivoted guide finger mounted upon said support spring-pressed into engaging relation to said axially disposed part of said line follower to maintain engagement of the follower with the line.

8. In a fishing reel, the combination of a frame, a spool rotatably mounted in said frame, a support movably mounted for axial movement with respect to said spool, means operable in accordance with the movement of said spool for moving said support, a line follower pivoted to said frame and having an axially disposed part engagingly resting upon the line wound upon said spool, and a pivoted guide finger mounted upon said support spring-pressed into engaging relation to said axially disposed part of said line follower to maintain engagement of the follower with the line, said guide finger having spaced line guides.

9. In a fishing reel, the combination of a frame, a spool rotatably mounted in said frame, a support movably mounted for axial movement with respect to said spool, means operable in accordance with the movement of said spool for moving said support, a line follower pivoted to said frame and having an axially disposed part engagingly resting upon the line wound upon said spool, and a pivoted guide finger mounted upon said support spring-pressed into engaging relation to said axially disposed part of said line follower to maintain engagement of the follower with the line, said guide finger having spaced line guides, one of said guides being disposed adjacent said axially disposed part of said line follower.

10. In a fishing reel, the combination of a frame, a spool rotatably mounted in said frame, a support movably mounted for axial movement with respect to said spool, means operable in accordance with the movement of said spool for moving said support, a line follower pivoted to said frame and having an axially disposed part engagingly resting upon the line wound upon said spool, a guide finger pivoted to said support on an axis substantially in alignment with the pivotal axis for said line follower, said guide finger being spring-pressed into bearing engagement adjacent its end with said axially disposed part of said line follower to maintain engagement of the follower with the line, and spaced line guides on said guide finger.

11. In a fishing reel, the combination of a frame, a spool rotatably mounted in said frame, a support movably mounted for axial movement with respect to said spool, an operating element for said support operated in accordance with the operation of said spool for reciprocally moving said support axially of said spool, a line follower pivoted to said frame and having an axially disposed part engagingly resting upon the line wound upon said spool, a guide finger pivoted on said support on an axis substantially in alignment with the pivotal axis of said line follower and having its end portion in sliding engagement with said axially disposed part of said line follower, spring means for maintaining said sliding engagement between said guide finger and said line follower and to maintain engagement of the follower with the line, and guide means on said guide finger for the line wound upon said spool.

12. In a fishing reel, the combination of a frame, a spool rotatably mounted in said frame, a support movably mounted for axial movement with respect to said spool, an operating element for said support operated in accordance with the operation of said spool for reciprocally moving said support axially of said spool, a line follower pivoted to said frame below said operating element and having an axially disposed part above said operating element engagingly resting upon the line wound upon said spool, said support having an arm depending therefrom below said operating element, a hook-shaped guide finger pivoted to said depending arm substantially in alignment with the pivotal axis for said line follower, said guide finger extending over said operating element into sliding engagement with said axially disposed part of said line follower, spring means on said support engaging said guide finger for maintaining said guide finger in sliding engagement with said line follower and to maintain engagement of the follower with the line, and guide means on said guide finger for receiving and guiding line from said spool.

NOBLE A. NELSON.

CERTIFICATE OF CORRECTION.

Patent No. 2,312,576.  March 2, 1943.

NOBLE A. NELSON.

It is hereby certified that error appears in the printed specification of the above numbered patent requiring correction as follows: Page 3, first column, line 72, claim 5, before the word "swingably" insert --line follower--; same line, strike out "line follower" and insert --upon said frame and--; line 74-75, strike out "movably mounted upon said support and"; line 75, after "follower," insert --said guide finger being mounted on said support for movement toward and away from said line follower,--; and that the said Letters Patent should be read with this correction therein that the same may conform to the record of the case in the Patent Office.

Signed and sealed this 20th day of April, A. D. 1943.

(Seal)

Henry Van Arsdale,
Acting Commissioner of Patents.